July 27, 1965 L. R. STONE ETAL 3,197,639
RADIOACTIVE SOURCE HOLDER
Original Filed Sept. 1, 1959 4 Sheets-Sheet 2

INVENTORS
LEONARD R. STONE
THOMAS J. RADCLIFFE
BY GEORGE W. SOWER
W. H. Woodlief
ATTORNEY July 27, 1965   L. R. STONE ETAL   3,197,639
RADIOACTIVE SOURCE HOLDER
Original Filed Sept. 1, 1959   4 Sheets-Sheet 3

INVENTORS
LEONARD R. STONE
THOMAS J. RADCLIFFE
BY GEORGE W. SOWER
W. H. Woodlief
ATTORNEY

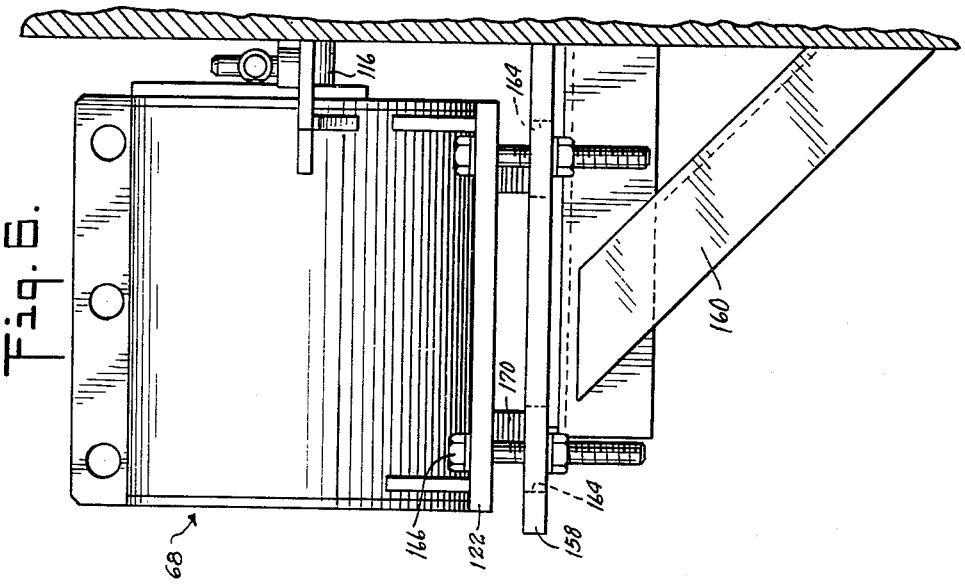
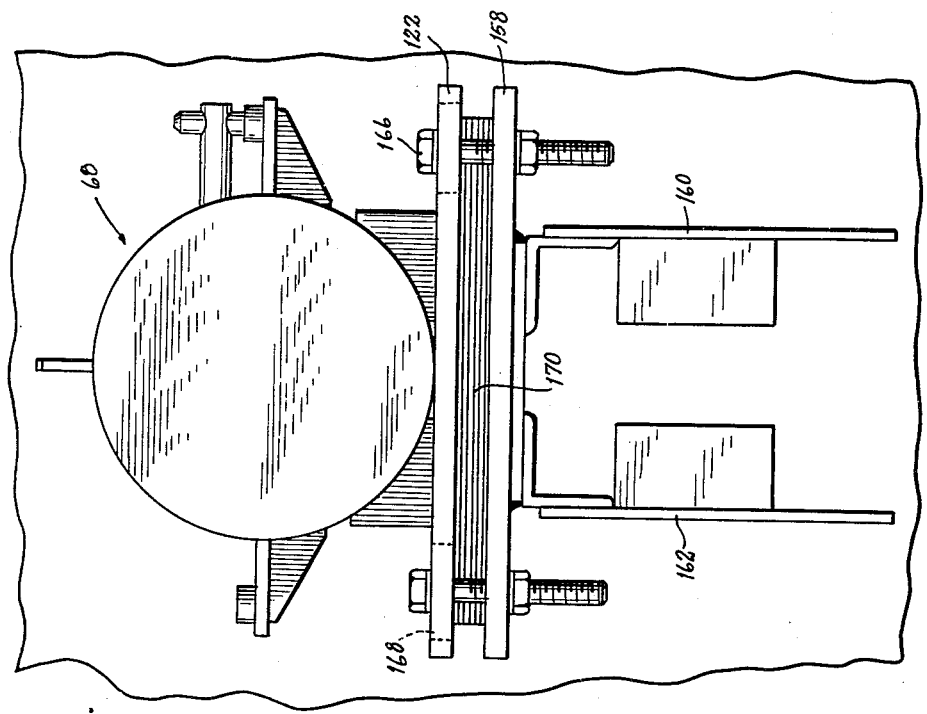

United States Patent Office 3,197,639
Patented July 27, 1965

3,197,639
RADIOACTIVE SOURCE HOLDER
Leonard R. Stone, South Euclid, Thomas J. Radcliffe, Warrensville, and George W. Sower, Cleveland Heights, Ohio, assignors to Republic Steel Corporation, Cleveland, Ohio, a corporation of New Jersey
Original application Sept. 1, 1959, Ser. No. 837,403, now Patent No. 3,133,191, dated May 12, 1964. Divided and this application Sept. 25, 1961, Ser. No. 140,486
4 Claims. (Cl. 250—106)

This invention relates to radioactive source holders. The source holders herein were conceived and designed as part of a system for detecting the position and disposition of stock within a blast furnace. Said system is fully disclosed in our copending application for United States patent, Serial No. 837,403, filed September 1, 1959 and issued on May 12, 1964, as Patent No. 3,133,191 for Blast Furnace Stock Level Control, and this application is a division thereof.

The invention of our aforesaid application for patent is predicated on the concept that a directional beam, generated externally of the furnace, can be passed through the furnace where it is not attenuated by the stock within the furnace, that such beam can be detected at the opposite side of the furnace, and that when a plurality of such beams are generated and detected at a plurality of furnace levels, they can be used to show the level of stock within the furnace. Accordingly, said invention is a specific application contemplates the generation, directional projection, and detection of beams of radioactive materials for the stated purpose.

In its more particular aspects, the invention concerns itself with a nuclear furnace stock gauging system for measuring and indicating the position of stock inside a blast furnace. The system contemplates an arrangement of radioactive sources on one side of a blast furnace and a corresponding arrangement of radiation detectors on the other side. Each radioactive source sends a narrow beam of radiation, e.g., gamma rays, through the furnace to its corresponding detector which measures the changes in the amount of radiation received and transmits corresponding signals which energize control circuits for indicating and recording the level and disposition of stock within the furnace, or which, in the alternate, may be employed to control an automatic furnace charging system.

A blast furnace is a tall cylindrically shaped structure of furnace brick encased in an external shell of steel. The process of extracting iron from its ore involves charging a mixture of ore, coke and flux in proper proportions through a specially constructed charging chamber at the top of the furnace. The charging chamber has a small bell at the top of the chamber and a large bell at the bottom of the chamber which bells are alternately opened and closed to first fill the charging chamber and then release the charge of stock into the furnace. By this means, furnace pressures can be maintained and gases can be confined even though the furnace is charged with new stock at relatively short recurring periods.

The physical structure of blast furnaces imposes the requirement that the radioactive source holders to be supported thereon be sufficiently light and easy to handle to permit their installation at a substantial height near the top of the furnace without resort to special hoisting equipment. Furthermore, unusually heavy loads on the furnace, particularly near the top thereof, must be avoided. It is, therefore, an object of the present invention to provide a radioactive source holder which will provide adequate shielding against uncontrolled radiation, yet one which is sufficiently light and convenient for installation at a substantial height at the exterior of the furnace, such that they may be elevated for installation by convenient and readily available hoist equipment and such that they will not impose an undue load on the furnace when installed.

The radioactive source holders herein are intended for use in cooperation with axially aligned beam ports which extend through opposite walls of the furnace. Since these ports are of substantial length due to the thickness of the furnace walls, it is necessary that the beam port of the source holder be properly registered with the beam ports in the furnace wall. Accordingly, it is a further object of the invention to provide means for adjustably mounting the source holders on the external wall of the furnace to facilitate the registration of the source holder beam port and the beam ports in the furnace wall.

Furthermore, since it is intended that the source holders be employed in the presence of furnace operating and servicing personnel who is not specially trained or skilled in the use or handling of radioactive material or instruments, it is an essential requirement that the source holders embody every possible safeguard for the protection of such personnel. Therefore, it is still another object of the invention to provide a source holder having an easily operated shutter for its beam port which can be closed by the mere turn of a simple lever to effectively confine the radioactive material within the holder against all external radiation. In addition, it is also an object of the invention to provide a radioactive source holder whose beam port may be closed and locked against inadvertent or unauthorized opening.

Finally, it is a further specific object of the invention to provide a radioactive source holder which is constructed to serve also as a shipping receptacle for the radioactive material employed therein. This feature provides a further safeguard to personnel at the location at which the holders are to be installed and used, since it makes it possible to confine the handling of the radioactive material to those who are specifically trained and equipped to do so with the greatest degree of safety.

These and other advantages and objectives of the invention will be further developed in the detailed description that follows, which description is illuminated by the drawings forming a part hereof.

In the drawings, like reference numerals indicate like parts, and in said drawings:

FIG. 5 is an end elevational view of the radiation source holder installed on a supporting bracket fixed to the outside of a blast furnace; and FIG. 6 is a side elevational view of the structure in FIG. 5.

Figure 1:
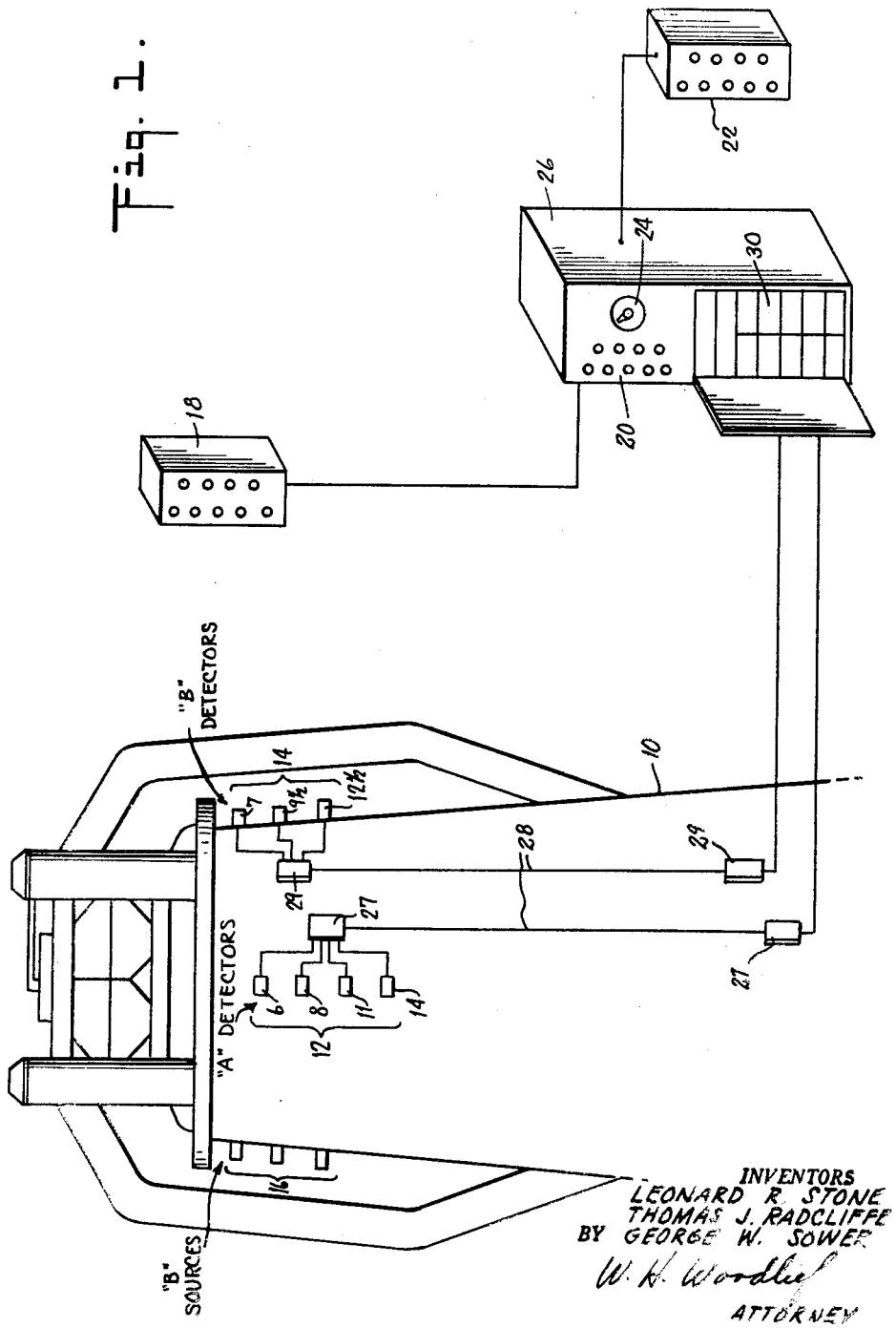
FIG. 1 is a diagrammatic representation of the blast furnace stock detector in association with the upper portion of a blast furnace and showing the remotely located components thereof.
Figure 2:
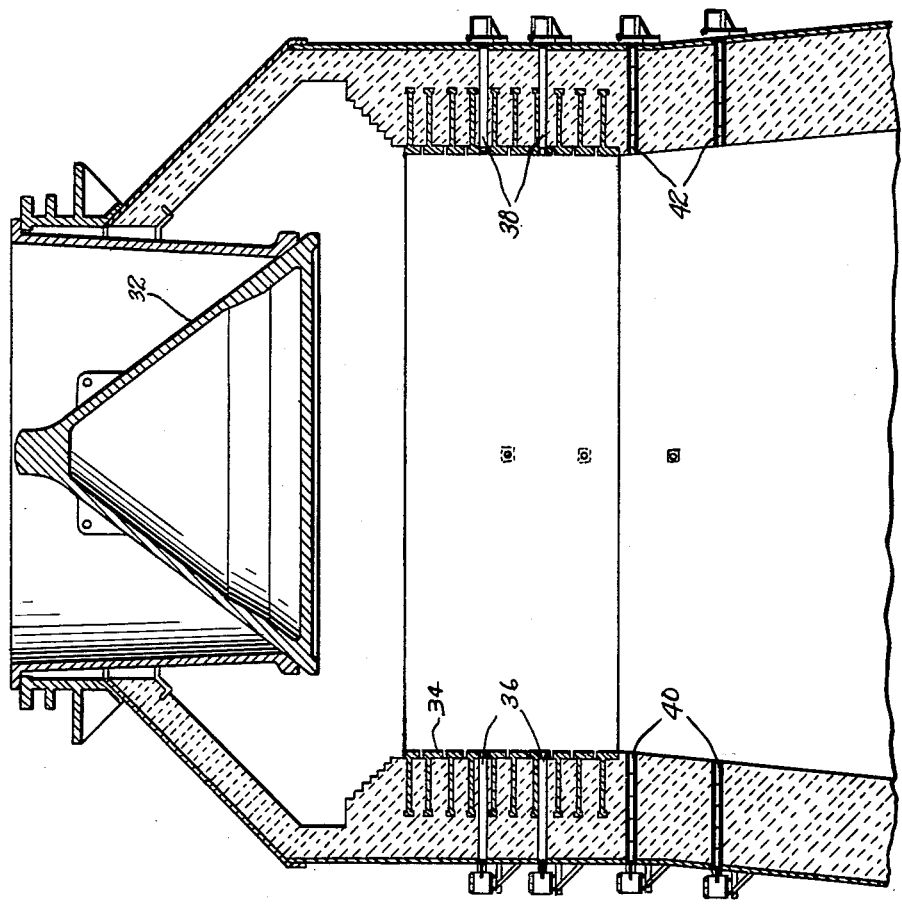
FIG. 2 is a vertical sectional view through the upper portion of a blast furnace indicating the location of ray ports in the furnace wall and associated radiation sources and detectors.

As shown in FIG. 1, the upper portion of the blast furnace 10 has associated therewith a plurality of radiation detectors 12 and 14. In one installation, seven radiation sensing devices are mounted outside the furnace shell. These detectors are mounted on the South and West sides of the furnace at levels corresponding to paired radiation source containers 16 on the North and East sides of the furnace. Specific compass directions used herein have significance only as a convenient means of identification.

Each detector unit utilizes a matrix of halogen-quenched, geiger tubes to measure the radiation beam coming from its respective radiation source on the opposite side of the furnace. Radiation passing into the geiger tubes produces voltage pulses at their output. The number of voltage pulses produced at the output of the geiger tubes is proportional to the amount of radiation detected by the tubes. Since the amount of radiation reaching the geiger tubes is reduced when furnace burden obstructs the radiation beam, the pulses produced at the output of the tubes are also reduced. The pulses are then transmitted to an amplifying section in the control station.

Seven 1 curie cobalt 60 sealed radiation sources are respectively paired with the radiation detectors at a point on the furnace 180° displaced in respect to the radiation detectors with which they are paired. Each radiation source holder is a lead lined container equipped with a lever operated shutter to facilitate control of the radiation beam. With the shutter operating lever in the "on" position, a narrow radiation beam will emerge from the front of the container. With the shutter operating lever in the "off" position, the radiation beam is blocked by several inches of lead within the shutter structure and the container then constitutes a safe storage receptacle for the radiation source.

Three source containers, mounted on the North side of the furnace, send radiation beams through the furnace in a North-South direction. These source containers are mounted outside the furnace shell 7 feet, 9½ feet and 12½ feet respectively, below the bottom of the large bell. Four source containers mounted on the East side of the furnace send radiation beams through the furnace at levels 6 feet, 8 feet, 11 feet and 14 feet respectively, below the bottom of the large bell.

The radiation transmission system includes a unique radiation beam port design which provides an aligned coaxial path through opposite walls of the furnace for each holder-detector combination. The beam ports, as more fully shown and described in our aforesaid application for patent, Serial No. 837,403, provide openings in the furnace lining and through its shell through which radiation is transmitted from the radiation source on one side of the furnace to the corresponding detector on the other side. Since both the radiation source and the detector are mounted outside the furnace shell, the beam ports are provided in the lining on both sides of the furnace. Without the openings, the solid furnace lining would attenuate any radiation beam directed through the furnace. The beam port openings are equipped with metal sub-dividing walls in the form of metal cups which prevent clogging of the openings by the furnace stock. These devices are almost transparent to gamma radiation and, therefore, permit efficient transmission of the radiation beam through the furnace at each level when stock is below that level.

Each detector unit contains its own high voltage power supply so that no high voltage cables need be disposed in the area in which furnace operating personnel normally works. Accordingly, the detector units in addition to the geiger tubes include transformers, rectifiers and voltage regulators to provide between 850 and 950-volts direct current for the operation of the geiger tubes. Finally, the detector units also contain a transmission circuit for the output of the geiger tubes, and also adjuncts of a calibrating system all of which are described in detail in said above-noted parent application.

The voltages developed in the detector units are transmitted to a control station 26 via transmission lines 28. The control station 26 includes an amplifier section 30 having therein an amplifier for each array of geiger tubes, a power supply section, an indicator section 20 and a recorder 26.

Each of the seven amplifiers receives signals transmitted from a detector unit via the transmission line 28 and by means of an integrating circuit, operates a small relay. In the exemplary embodiment, this relay operates a neon lamp and, as stated, it also energizes a power relay through which any desired control functions can be performed.

The signal lamps 20 give a continuous visual indication of the level of the stock inside the furnace. Seven of these lamps correspond to the seven levels at which the detectors are mounted. The eighth lamp is a flasher which operates when the stock is above the 6 foot level, and the ninth lamp is also a flasher which operates when the stock is above the 7 foot level. When the level of the stock is above the 6 foot level, all of the lights in the bank of indicating lights 20 are off with the exception of the two flashing lights. When the stock is below the 6 and 7 foot levels, the flashing lights will cease flashing and will provide a continuous illumination. As the stock moves below each successive measuring level, the corresponding light for the level will come on. Each light will stay on as long as the stock remains below that particular level.

The control station 26 will ordinarily be located in the gas house while the remote indicator lamps 18 and 22 may be located at other points such as, for example, in the stock house and in the cast house. The indicators 18 and 22 are duplicates of the indicator at the control station 26 and provide to the operators a continuous visual record of the stock level.

Figure 3:
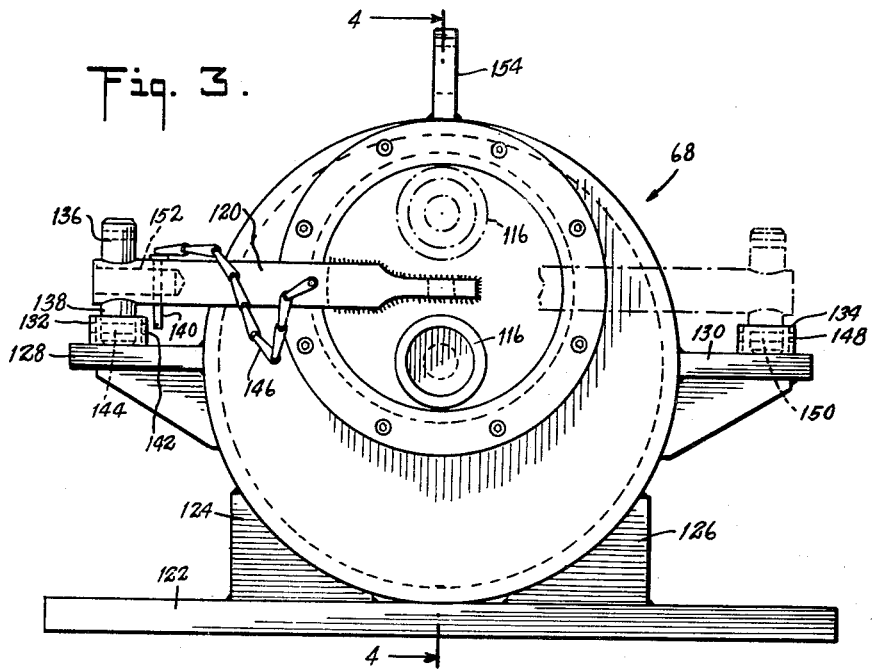
FIG. 3 is an end elevational view of a radiation source holder comprising the subject matter of this invention.
Figure 4:
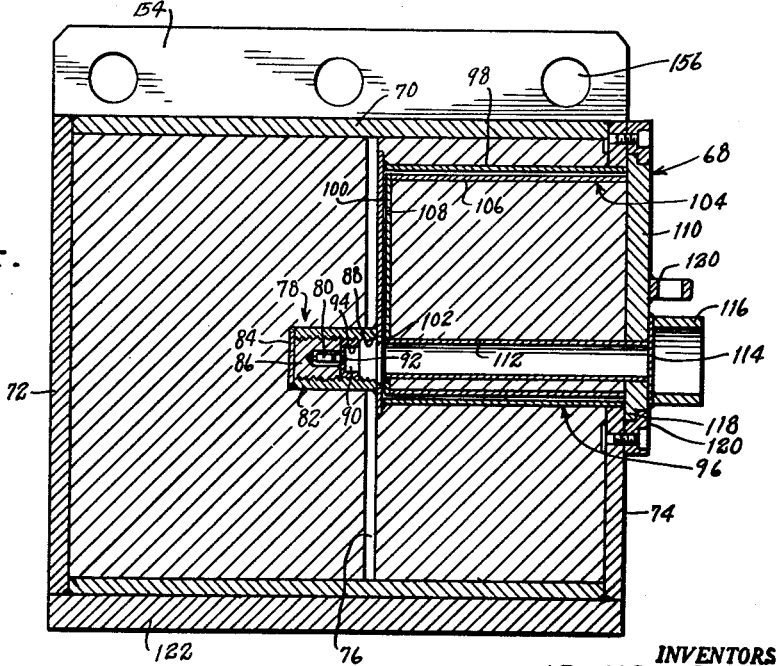
FIG. 4 is a cross-sectional view of the radiation source holder taken on line 4—4 of FIG. 3.

This invention, as stated, is specifically concerned with the radiation source holders 16 which are mounted on suitable brackets on the outside of the furnace. Each source holder constitutes a receptacle for suitable radioactive material. A radioactive source holder is illustrated in FIGS. 3 and 4, while the mounting thereof on the outer wall of the furnace is shown in FIGS. 5 and 6. A one curie cobalt 60 radiation source is sealed in each of the source holders. Any other suitable radioactive material, such as radium or cesium 137, may be employed, for example. Each source holder is equipped with a lever operated mechanical shutter to faciliate control of the radiation beam. With a shutter operating lever in the "on" position, a narrow radiation beam, as stated, will emerge from the front of the holder and pass through the related beam port. With the shutter operating lever in the "off" position, the radiation beam is blocked by lead, and the holder, under these conditions, is a safe storage and shipping receptacle for the radiation source.

By reference to FIGS. 3 and 4, it will be seen that the source holder 68 consists of a cylindrical side wall 70 and a pair of end walls 72 and 74. An internal radial brace 76 extends across the diameter of the container substantially intermediate the length of the side wall 70. Supported in the brace 76 is a capsule 78 adapted to hold a quantity of radioactive material 80. The capsule 78 has a tubular body portion 82 which is open at one end and sealed at the opposite end by a plate 84 welded thereto. The bottom half of the capsule is filled with lead 86 which has formed therein a suitable cavity for holding the radioactive material 80. The outer end of the capsule 78 has formed therein internal screw threads 88 adapted to engage the corresponding threads of a closure nut 9. The closure nut 90 has a thin head wall 92 to minimize its impedance to the flow of the radiant stream generated by the source material 80. After the radiation source material 80 is placed into the cavity of the capsule, the screw 90 is engaged by its hex socket 94 and is screwed down within the capsule 78 until the wall 92 thereof is in contact with the lead filling 86 and the radiation source material 80 is secured within the capsule.

The capsule 78 is formed as an extension of a shutter chamber 96 formed between the end wall 74 and the brace 76. The shutter chamber 96 is composed of a cylindrical body 98 and an end wall 100. The end wall 100 has an aperture 102 which registers with the capsule 78. The outer end of the cylindrical body 98 is welded into an aperture of corresponding size and shape formed in the end wall 74 of the holder. The shutter chamber 96 is adapted to receive a shutter mechanism 104 by which the beam aperture 102 in the plate 100 can be closed. The shutter mechanism 104 consists of a cylinder 106 which is only slightly smaller in both circumference and length than the cylindrical body 98. The inner end of the cylinder 106 is closed by an end plate 108, while the outer end thereof is welded to a face plate 110. Located eccentrically along the length of the shutter structure is a tube 112 which is adapted to register with the beam aperture 102 in the end plate 100 of the shutter housing 96. The outer end of the tube 112 extends through the face plate 110 of the shutter where it is sealed by a thin plate 114 which has welded thereto a short outwardly projecting the tube 116 adapted to extend substantially into contract with the outer wall of the furnace.

The face plate 110 of the shutter has an annular shoulder 118 formed therein which is adapted to seat in a correspondingly flanged annulus 120 which is fixed to the plate 74 and which provides a bearing surface on which the shutter structure can be rotated.

Welded to the face of the plate 110 is a shutter operating lever 120 which extends in a radial direction beyond the diameter of the container. By manipulating the operating handle 120 from the full line position of FIG. 3 to the dotted line position of the same figure, the tube 116 and the beam tube 112 will be rotated from the full line position of FIG. 3 in which the shutter is open to the dotted line position of FIG. 3 in which the shutter is closed. The inerior of the container 68, as well as the interior of the shutter 104, are filled with lead such that when the shutter is operated into its closed position, the lead in the shutter chamber will be shifted into the path of the radiation beam and will thereby avoid radiation to the exterior of the container.

As shown in FIG. 3, the holder 68 is mounted on a base plate 122 by means of a pair of mounting brackets 124 and 126 at both the front and rear ends of the holder. The base plate 122 has suitable bolt holes by means of which it is attached to a mounting bracket as will be shown in connection with FIGS. 5 and 6. Extending outwardly in a radial horizontal direction at the center line of the holder are a pair of brackets 128 and 130. These brackets have mounted thereon sockets 132 and 134, respectively. The sockets are in the form of a nipple adapted to receive lugs 136 and 138 extending in opposite radial directions from the free end of the shutter operating lever 120. Thus, when the shutter is turned to its on position, the lug 138 will extend into the socket 132, such that a pin 140 may be passed through aligned passages 142 and 144 in the socket and lug, respectively. The pin 140 may be attached to the shutter operating lever 120 by means of a flexible connection such as the chain 146. Thus the shutter can be latched in its open position.

When the shutter is closed by rotating the same about its axis by means of the shutter operating lever 120, the lug 136 on the shutter operating lever 120 will enter the socket 134 as shown in the dotted line position of the operating lever in FIG. 3. When so disposed, the pin 140 can be passed through registering passages 148 and 150 in socket 134 and lug 136, respectively.

Furthermore, the free end of the shutter operating lever 120 has an axial bore 152 therein which is adapted to receive an extension rod (not shown) which may be latched to the shutter operating lever by the pin 140 by passing the pin through registering passages in the socket 152 and the end of the extension lever. Ordinarily, the shutter can be operated by means of its operating lever 120 but after long periods of time without shutter manipulation, it may require the added leverage afforded by an extension lever.

A rib 154 is welded in an axial direction along the top of the holder. This rib has a plurality of holes 156 therethrough so that it affords a means for attaching hoist mechanism for elevating the holder into position at the top of the furnace.

A platform 158 is supported from the outside furnace wall by means of a pair of brackets 160 and 162 as shown in FIGS. 5 and 6. At each position provided for the installation of a radiation source holder, the platform 158 has elongated bolt holes 164 at the four corners thereof adapted to receive four holder mounting bolts 166. The corresponding bolt holes 168 in the base plate 122 of the source holder are elongated in a direction at right angles to the length of the bolt holes 164 of the platform 158. This provides for universal adjustment in the horizontal plane of the source holder such that it can be accurately aligned in respect to the beam port with which it is to be associated. Adjustment of the source holder in the vertical plane is accomplished by interposing shims 170 between the platform 158 and the base plate 122. In order to render the adjustment in the vertical plane effective, the platform 158 will usually be fixed to the outside furnace wall at a point which is slightly below the theoretical optimum point for supporting the source container.

As seen in FIG. 6, the source container is so mounted that the tubular projection 116 of the shutter structure is substantially in contact with the outside furnace wall when a proper installation is made.

The radiation detection equipment is mounted on a suitable chassis which is placed within a protective metal box. These detector boxes are supported adjacent the outside furnace wall such that the Geiger tube cluster of the detector unit is disposed at the outer end of the radiation ports with which the units are associated.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. A shielded radioactive source holding receptacle adapted to transmit a collimated radioactive beam in a fixed linear direction in relation to a major axis of said receptacle, said receptacle consisting of a cylindrical side wall and a pair of end walls, an imperforate body of ray shielding material substantially filling one end of said receptacle, a cavity adapted to receive a radioactive source extending through the inner face of said body of shielding material, means for holding a radioactive source in fixed position within said cavity, a radioactive beam path between said cavity and the end wall of said receptacle confronting the open end of said cavity, a beam shutter for said radioactive beam path comprising a shielding cylinder rotatably mounted within said receptacle in a position between the open end of said source cavity and said last named end wall whereby it is normally interposed in said beam path, said shutter having a disk-shaped face plate mounted for rotation on said last named end wall, a tubular radiation transmission duct eccentrically located in said shielding cylinder in axial position thereto for alignment with said source receiving cavity and said beam path when said shutter is rotated, and a lever externally fixed to said face plate and extending beyond said source holder in a radial direction whereby said shutter may be rotated to align said radiation transmission duct with said source cavity and said beam paths.

2. The structure of claim 1 in which said cavity is internally screw-threaded, and said means for holding the radioactive source fixed in said cavity comprises a plug having external screw threads adapted to engage the screw threads of said cavity.

3. The structure of claim 1 which provides means for securing said lever in an operated position whereby the same is held against inadvertent operation of said shutter.

4. The structure of claim 1 in which said disk-shaped face plate has an annular shoulder rotatably engaging a flanged annulus carried by said end wall.

References Cited by the Examiner

UNITED STATES PATENTS 2,872,587  2/59  Stein _____ 250—106

FOREIGN PATENTS 71,328  6/59  France
(1st add. of Pat. No. 1,149,712)

RALPH G. NILSON, *Primary Examiner.*

ARCHIE R. BORCHELT, *Examiner.*